Jan. 7, 1936.  R. S. TYLER ET AL  2,026,715
EXTERNAL CONTRACTING BRAKE
Filed Feb. 26, 1932   2 Sheets-Sheet 1

INVENTORS.
Ralph S. Tyler and
BY William M. Reichart
Fay Oberlin & Fay
ATTORNEYS.

Jan. 7, 1936.  R. S. TYLER ET AL  2,026,715
EXTERNAL CONTRACTING BRAKE
Filed Feb. 26, 1932  2 Sheets-Sheet 2

INVENTORS.
Ralph S. Tyler and
BY William M. Reichart

Ray Oberlin & Ray
ATTORNEYS.

Patented Jan. 7, 1936

2,026,715

UNITED STATES PATENT OFFICE 2,026,715

EXTERNAL CONTRACTING BRAKE

Ralph S. Tyler, Cleveland Heights, and William M. Reichart, Cleveland, Ohio, assignors to The Chandler & Price Company, Cleveland, Ohio, a corporation of Ohio Application February 26, 1932, Serial No. 595,289

3 Claims. (Cl. 188—77)

This invention relates, as indicated, to paper cutting machines, but has reference more specifically to a brake which is particularly adapted for use in such machines but which may be used in connection with other machines.

A primary object of the invention is to provide a brake in which wear of the brake lining is taken up automatically without the necessity of manual adjustments.

Another object of the invention is to provide a brake in which a uniformly distributed pressure may be applied to the brake drum, resulting in an even braking action and uniform wear of the brake lining.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
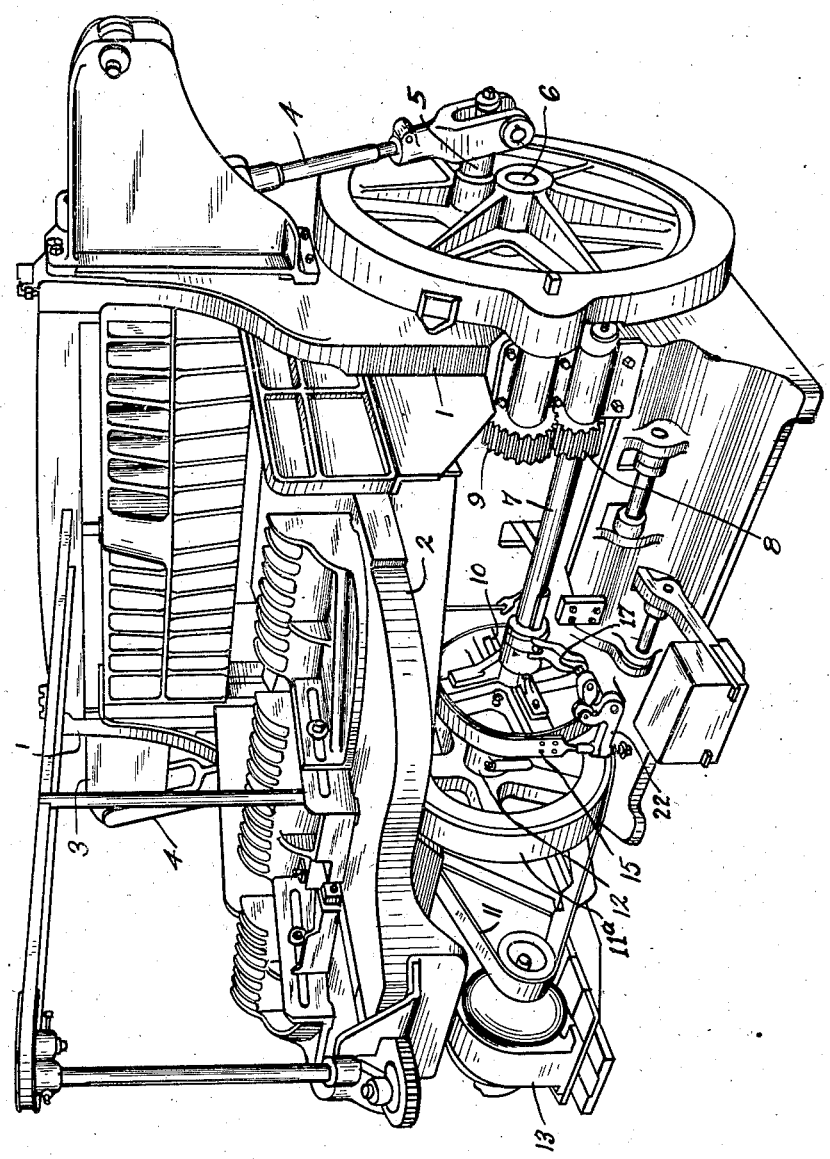
Figure 2:
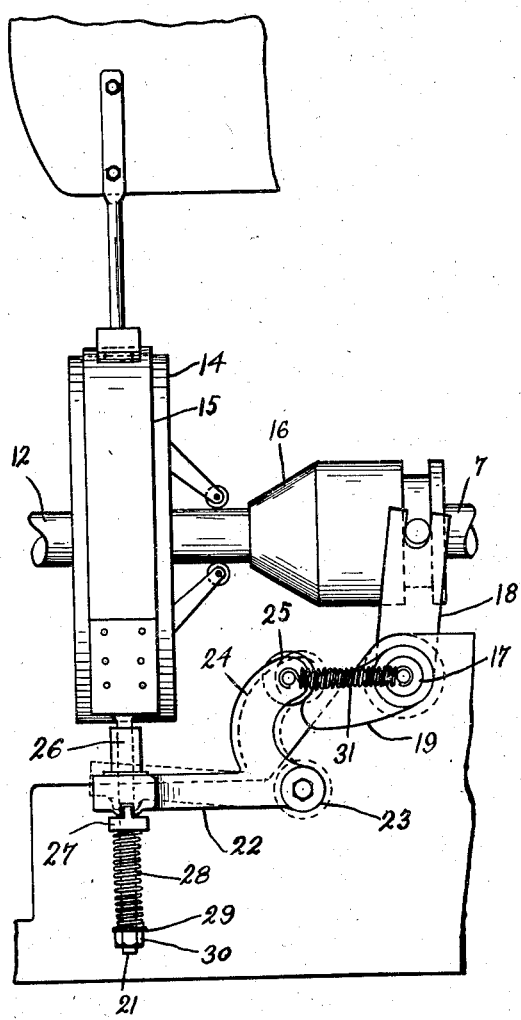
Figure 3:
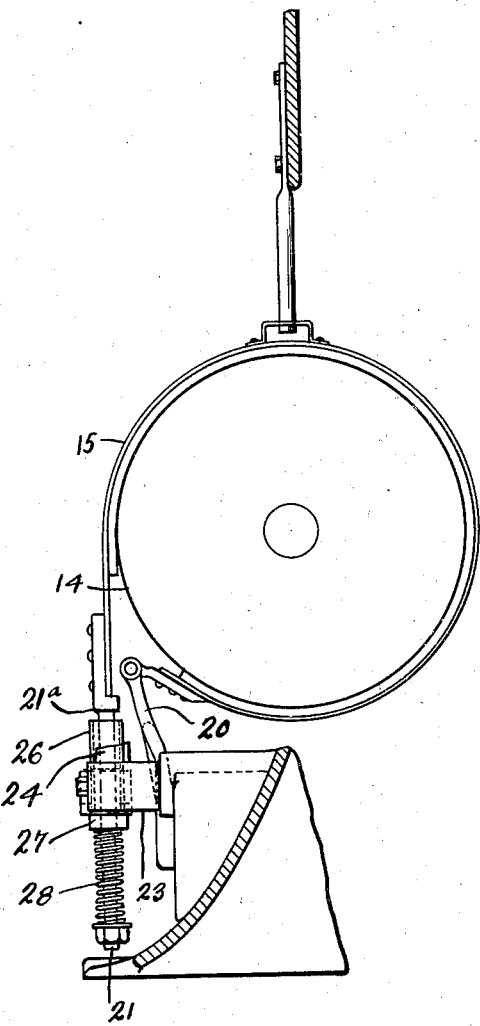

In said annexed drawings:

Fig. 1 is a perspective view of a paper cutting machine, showing the brake and its operating mechanism; Fig. 2 is an elevation of the brake and its operating mechanism; and Fig. 3 is a side view of the brake.

Referring more particularly to the drawings, the invention is shown in association with a paper cutting machine comprising side frames 1 and a bed or table 2. Above the table 2, the side frames are provided with slots for receiving a knife bar 3, one end of which is connected by a rod 4 with crank 5 mounted upon the end of a horizontal shaft 6. The shaft 6 is driven by another shaft 7 through suitable gears 8 and 9, while the latter shaft is driven through a clutch 10 by a pulley 11a mounted upon a continuously rotating shaft 12 revolved by a suitable motor 13 and belt 11. The shaft 7 carries a brake drum 14 controlled by a brake band 15.

The operating cone 16 of the clutch is actuated by a rocker shaft 17 which carries a forked arm 18 and a cam 19. One end of the brake band 15 is secured to a bracket 20 which is rigidly secured to the base of the machine, and to the other end of the band is secured a stem 21. The stem 21 extends through an arm 22 of the bell crank lever 23 which is pivotally secured to the base of the machine, and the other arm 24 of which supports a roller 25. Slidably mounted on the stem 21 and resting on the arm 22 is a collar 26. Mounted on the stem 21 below the arm 22 are a vertically slidable collar 27 and a coil spring 28, the lower end of which bears against a washer 29 secured in position by a nut 30.

When it is desired to release the clutch and energize the brake, the shaft 17 is rotated to move the cone 16 to the right, as viewed in Fig. 2. This rotation causes the cam 19 to bear against the roller 25, thus moving the bell crank lever 23 to the position shown in Fig. 2, and causing the arm 22 thereof to bear against the collar 27, which in turn bears against the spring 28. This forces the stem 21 of the brake band downward sufficiently to tighten the band about the drum 14.

When it is desired to engage the clutch and release the brake, the shaft 17 is rotated in the opposite direction, thereby rotating the cam 19 in a counterclockwise direction, as viewed in Fig. 2, and permitting a coil spring 31 to rotate the ball crank lever 23 to the position indicated in dotted lines. In moving to this position, the arm 22 of the lever 23 forces the collar 26 against the shoulder 21a of the stem 21, thereby causing the end of the brake band to move upward sufficiently to relieve the braking pressure of the band on the drum 14.

It has hitherto been the practice in energizing brakes of this type, to exert a direct downward pull against a collar rigidly secured to the brake band stem, but in such cases, it has been necessary to manually adjust the various parts to compensate for the wear of the brake lining.

By the use of a sliding collar such as 27, and a coil spring, such as 28, the wear of the brake lining is taken up automatically, making it unnecessary to readjust the brake. The pressure exerted on the brake is equal to the pressure which the spring 28 exerts, and is uniformly distributed over the brake drum 14. As the brake lining wears, the spring 28 takes up the lost motion and thus compensates for the wear.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a brake for a paper cutting machine or the like, a brake drum, a brake band encircling said drum having a lining adapted to engage the surface of said drum and a stem secured directly to and extending from one end of the band, said stem being tangential to said brake drum, a fixed element on said stem, a slidable collar on said stem, a coil spring mounted on said stem between said fixed element and collar, means for tensioning said brake band including a lever having an arm operative to depress said collar and spring against said fixed element, and means for releasing said brake band, said last-named means including said lever and a spring for actuating said lever.

2. In a brake for a paper cutting machine or the like, a brake drum, a brake band encircling said drum and having a shouldered stem secured directly to and extending from one end of said band, said stem being tangential to said brake drum, a fixed element on said stem, a slidable collar on said stem, a coil spring mounted on said stem, between said fixed element and collar, means for tensioning said brake band including a lever having an arm operative to depress said collar and spring against said fixed element, and means for releasing said brake band including spring means and a second collar slidable on said stem, the said lever arm and spring means operative to move said second collar against the shoulder of said stem.

3. In a brake for a paper cutting machine or the like, a brake drum, a brake band encircling said drum having a lining adapted to engage the surface of said drum and a shouldered stem secured to one end of the band, and means for releasing said band from engagement with the drum, said means including a collar slidably mounted on said stem, a lever having an arm on which said collar rests and a spring operative to cause said lever to elevate the shoulder of said collar into engagement with said stem.

WILLIAM M. REICHART.
RALPH S. TYLER.